(12) United States Patent
Parande

(10) Patent No.: US 10,678,402 B1
(45) Date of Patent: Jun. 9, 2020

(54) INTERACTIVE BOT FOR NATURAL LANGUAGE ANALYTICS

(71) Applicant: Amazon Technologies, Inc., Seattle, WA (US)

(72) Inventor: Taruja Sanjay Parande, Foster City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 15/804,817

(22) Filed: Nov. 6, 2017

(51) Int. Cl.
*G06F 3/048* (2013.01)
*G06F 3/0482* (2013.01)
*G06F 3/16* (2006.01)
*G06F 3/023* (2006.01)
*G06F 3/0488* (2013.01)
*G06F 16/338* (2019.01)
*G06F 16/33* (2019.01)

(52) U.S. Cl.
CPC .......... *G06F 3/0482* (2013.01); *G06F 3/0237* (2013.01); *G06F 3/04886* (2013.01); *G06F 3/167* (2013.01); *G06F 16/338* (2019.01); *G06F 16/3344* (2019.01)

(58) Field of Classification Search
CPC ........ G06F 3/0482; G06F 3/16; G06F 3/0488; G06F 3/023; G06F 17/30
See application file for complete search history.

(56) References Cited

U.S. PATENT DOCUMENTS

| | | | |
|---|---|---|---|
| 2014/0115538 A1* | 4/2014 | Kim | G06F 3/0236 |
| | | | 715/825 |
| 2017/0242886 A1* | 8/2017 | Jolley | G06F 17/2705 |
| 2017/0242899 A1* | 8/2017 | Jolley | G06F 3/0482 |

OTHER PUBLICATIONS

BI Intelligence, "Messaging apps are now bigger than social networks," [online] *Business Insider*, Sep. 20, 2016 [Retrieved on Nov. 3, 2017]. Retrieved from the Internet: <URL: http://www.businessinsider.com/the-messaging-app-report-2015-11>, 3 pages.

* cited by examiner

*Primary Examiner* — David E Choi
(74) *Attorney, Agent, or Firm* — Kilpatrick Townsend & Stockton LLP

(57) ABSTRACT

Embodiments of the present disclosure are directed to a system for providing an interactive bot. For example, the system may receive a first user interaction with an interactive bot at a user interface. The user interface may comprise a suggestion field and a text input field. Interface objects may be provided in the suggestion field as terms to provide to the interactive bot. The user may select the interface objects to add to the text input field, or the user may remove these interface objects without affecting other interface objects in the text input field. In some examples, the context terms in the interface objects may be determined from a context suggestion tree with a hierarchical structure.

21 Claims, 8 Drawing Sheets

INTERACTIVE BOT FOR NATURAL LANGUAGE ANALYTICS

BACKGROUND

Electronic systems employ the use of bots in various contexts. A bot, for example, may receive textual input from a user, look up an expected response from the textual input, and provide the expected response to the user via a user interface. Bots today can work mechanically and generically to respond to questions with answers or work autonomously to execute actions according to program code.

In instances of chat-bots, the presentation is especially mechanical and, thus, not dynamic. For example, a user inputs text, like a search query, and the chat-bot provides data in response to the search query, like search results or a link to information associated with the search query. The interaction is very linear. Chat-bots also limit the interaction to particular fields of a user interface, where the user will provide text in one field and receive responses in another field. There are two separate fields. The separation is needed for the chat-bot to properly delineate between the input and output. Additionally, customary chat-bots are incapable of mixing the input and output. Technical improvements to these electronic systems are desired.

BRIEF DESCRIPTION OF THE DRAWINGS

Various embodiments in accordance with the present disclosure will be described with reference to the drawings, in which.

DETAILED DESCRIPTION

Figure 1:
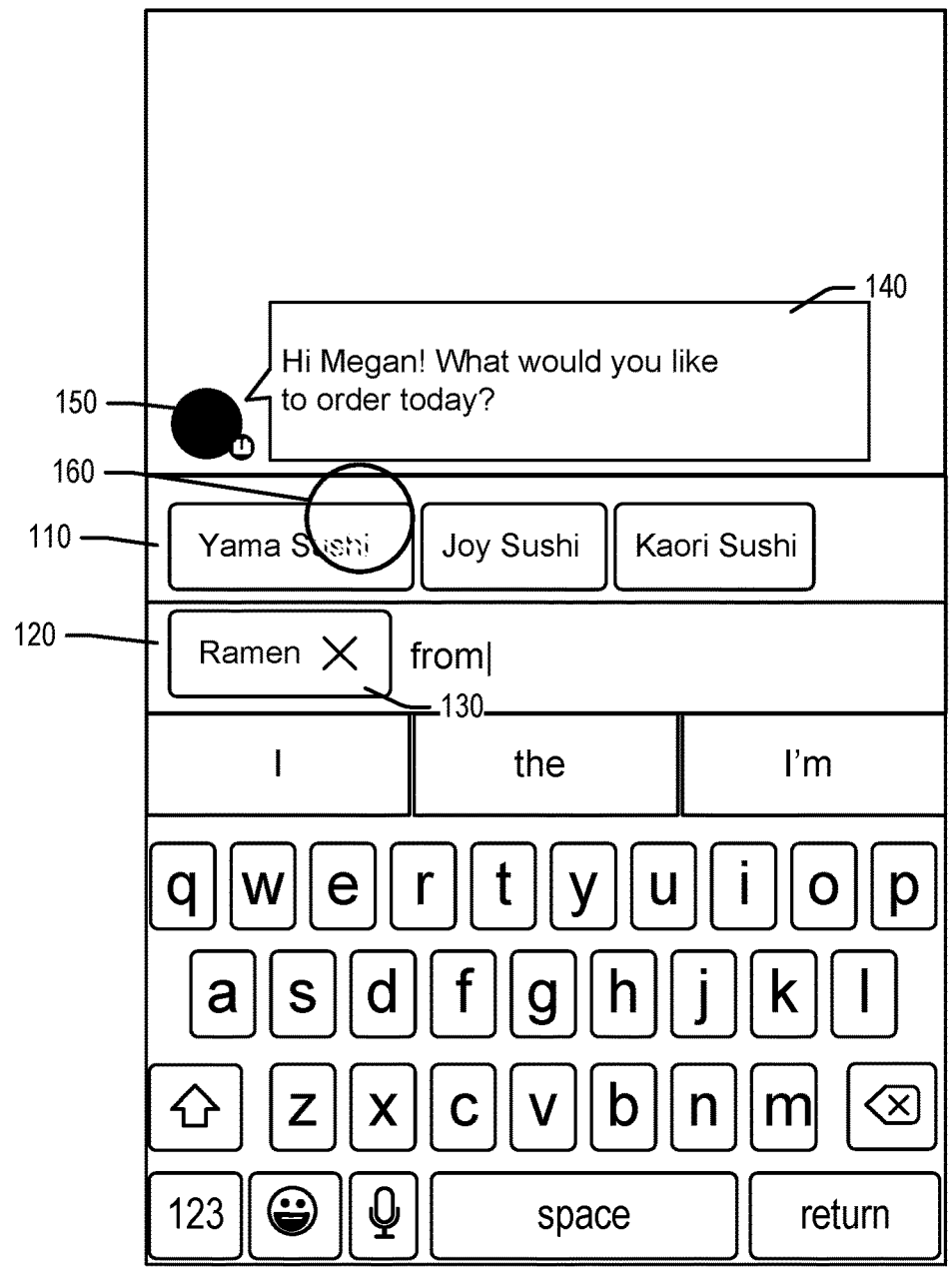
FIG. 1 illustrates an example user interface for providing an interactive bot, in accordance with embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing an interactive bot. For example, the system may receive a first user interaction with an interactive bot at a user interface. The user interface may comprise a suggestion field and a text input field. The user may provide the first interaction via a computing device of the user. The system may provide a first context term within an interface object. The interface object may be presented in the suggestion field of the user interface and the user interface may be operable to being added and removed from the text input field of the user interface irrespective of the other interface objects of the unit user interface. The system may receive a second user interaction with the interactive bot. The second user interaction may comprise a selection of the interface object, and in response to the second user interaction, the interface object may be updated from being presented in the suggestion field to being presented in the text input field of the user interface. The system may receive a third interaction with the interactive bot. The third user interaction may request search results associated with the context of the text input field included with the interface object. The system may initiate a search based at least in part on the contents of the text input field and provide the search results to the user interface.

Technical improvements may be realized with interactive bots, including chat-bots, through embodiments of the disclosure. For example, the computing device may implement a chat-bot to react dynamically to user's input. The input may be received from various text fields in the user interface, including a suggestion field or a text input field. For example, embodiments of the disclosure may implement a field on the user interface for both input of the user and output of the chat-bot, where the output presented in the field can be interactive (e.g., user can select it and receive additional information, user can remove it from the field, etc.).

Unlike existing systems, the interactive bot can properly operate by combining these two fields. This improves the technical features of the user interface by reducing the needed space for each type of input and improving the presentation and the user experience. For chat-bots in particular, the improved systems enable a more interactive chatting session by providing suggestions and interactive content.

In an illustrative example, a user accesses a software application on their mobile device or browses to a webpage, either of which would implement an interactive bot via a user interface. This action of opening the software application or the webpage may correspond with a first interaction with the interactive bot at the user interface. The interactive bot may be a computer program that is able to provide text or audio to mimic an action of the human. For instance, the interactive bot may be a chat-bot. In some examples, the interactive bot may receive an input, access data store that correlates the input with output, and provide that output in response to the input. As a simple illustration, the input may comprise a question "what is the temperature," the interactive bot may access the data store of temperatures to determine the current temperature, and provide the current temperature in response to the question (e.g., 70 degrees).

The user interface that receives the first interaction may comprise multiple portions, including a suggestion field and a text input field. The suggestion field may provide options for the user to select as the user's own input. In some examples, the options may comprise terms in the context of what is already in the text input field or what is expected by the system to be provided to the text input field. Once one of the options selected, the option from the suggestion field may be moved as an interface object into the text input field.

Once the interface object has been moved to the text input field, the position of the interface object may be moved within the text input field or removed entirely without affecting other input in the text input field (e.g., text, other interface objects, etc.).

In some examples, the interactive bot may provide a question to the user to elicit a second interaction. The question may include, for example, "what would you like to order today?" The user interface may also provide options for response for the user in the suggestion field. The user may select "previous orders," "cuisines near me," or "restaurants" as options provided at the user interface, or start typing a response to the question directly to the text input field. The user may type "R-A-M" as a start to the term "ramen." The system may compare the input from the user with a dictionary of predetermined terms (e.g., maintained in a data store). The identification of each term in the dictionary may correspond with a context suggestion tree as described below. When the user starts typing, the system may update the options in the suggestion field to include words that start with "R-A-M." The user may select one of these options with the second interaction with the user interface and the system may determine the suggestions based at least in part on the dictionary that corresponds with the selected option. The user interface may add the selected option from the suggestion field to the text input field of the user interface.

The user may provide other textual input (via a keyboard), audio input (via a microphone), or video input (via a camera) to the text input field. For example, after selecting an option from the user interface or typing textual input at the user interface, the user may also provide the word "from." The text input field may comprise the words "ramen" and "from." Considering the order of the terms in the text input field, the suggestion field may be updated with options that correspond with particular places that provide ramen. The user may select one of these options from the suggestion field, for example, "Yama Sushi." The system may generate an interface object with the selected option and add the selected option from the suggestion field into the text input field. The text input field may comprise a first interface object with the term "ramen," a text object with the term "from," and a second interface object with the term "Yama Sushi."

The selection of interface objects may correspond with a context suggestion tree having a hierarchical format tree structure. As illustrated with the current example, the context suggestion tree may comprise multiple levels of the tree, including a first level of items to order (e.g., ramen, sushi, etc.) and the second level of locations from which to order these items (e.g., Alpha Restaurant, Beta Restaurant, etc.). In other contexts, the levels of the tree may correspond with terms that are predefined by the system. In some examples, the system may identify connected terms through machine learning and iterative processing. Connector terms, such as "from" and "on," may alter branches of the tree to provide different suggestions at different points in time or corresponding with the terms that are currently in the text input field. Additional illustrations, examples, and functionality of the system is provided throughout the current disclosure.

FIG. 1 illustrates an example user interface for providing an interactive bot, in accordance with embodiments of the disclosure. In illustration 100, a user interface may be provided. The user interface may comprise a suggestion field 110 and a text input field 120. One or more interface objects 130 may be presented at the user interface. Other portions of the user interface may be provided as well. For example, the user interface may present a first interface object 140 to elicit a response from a user or may illustrate the interactive bot as a second interface object 150 to mimic an chat interaction with a human. In some examples, the user interface may provide tools to assist a user with input. For example, the tools may comprise a keyboard for textual input, a microphone for voice input, a camera for video input, and the like.

The correlation between the received user input and terms that are provided by the user interface may correspond with a context suggestion tree. Additional details about the context suggestion tree are provided with FIG. 4.

The user interface may provide context terms as interface objects in the suggestion field 110. The context terms may correspond with the input received at the user interface. In some examples, the context terms may correspond with the terms from the context suggestion tree. As illustrated, the suggestion field 110 comprises a first context term "Yama Sushi" within a first interface object, a second context term "Joy Sushi" within a second interface object, and a third context term "Kaori Sushi" within a third interface object. The interface objects may be movable within the user interface. The position of the interface object may alter the terms provided through the context suggestion tree as well. The interface object may be removed by interacting with the interface object through the user interface (e.g., by activating a tool to remove the interface object, selecting an "X" tool) or audibly by instructing the computing system to remove the interface object.

The user interface may receive text input in the text input field 120. In some examples, the text input may be converted to an interface object 130 based at least in part on a comparison of the input from the user with a dictionary of predetermined terms (e.g., maintained in a data store). Other examples may correlate the text input with a connector (e.g., "from," "at," etc.). The connector may alter the suggested interface objects with respect to interface objects that are currently in the text input field.

The user interface may be accessed through the navigation pane at a network page, a software application provided at a computing device of the user, or other methods known in the art. Upon initiating the user interface, the interactive bot may provide generic information available to all users (e.g., "what would you like to eat today") or other popular searches identified by other users. In some examples, the interactive bot may provide information associated with the user (e.g., "do you want to continue searching for cat videos"). The information associated with the user may be passed to the user interface. The origination of the information may correspond with the user profile (e.g., order history, prior interactions with the interactive bot or other network page, etc.) or the computing device itself (e.g., cookies, stored user credentials at the computing device, etc.).

When the user interface provides specific information, the system may access a user profile associated with the user. For example, the user may provide credentials associated with the user to the interactive bot (e.g., stored with a user device, stored with a data store and accessible through a user identifier, etc.). The interactive bot may identify a user profile associated with the credentials to determine interaction history associated with the user. As an illustrative example, the interaction history may identify past searches associated with the term "ramen." Based at least in part on this interaction history, the interactive bot may provide a question associated with searching for the term "ramen."

The selected interface objects in response to particular questions may be used to update the natural language processing (NLP) or natural language understanding (NLU) data store. For example, the first interaction with the system may identify a particular context term in response to the interface object 140 used to elicit a response from a user. The data store may correlate the particular context term with the interface object 140 that has a response from future users. The context suggestion tree may also be updated to correlate the particular context term with the interface object 140.

The computing device that populates the user interface may predict future user interactions based at least in part on past interactions or interface objects that are provided with the user interface. For example, the computing device may predict that the user will interact with a particular area 160 of the user interface to activate an interface object. The prediction may be based at least in part on context terms that have been added to the text input field 120, connector terms that are added to the text input field 120, or context terms that have not been added to the text input field 120, but remain in the suggestion field 110.

Other design features of the user interface may be implemented as well. For example, the text input field 120 may comprise ghost text that can suggest context terms in response to the interface object 140 used to elicit the response from the user. This may guide users to provide input having particular attributes that correspond with the context suggestion tree. As a sample illustration, the interface object 140 may query the user "what would you like to order today?" The ghost text in the text input box may comprise "type what food you want from Yama Sushi."

In some examples, the ghost text may comprise a context term, such as "ramen," or a connector term, such as "from" and "on," in the text input field 120. The user may interact with the user interface to select the ghost text, which may add the term corresponding with the ghost text to the text input field 120. Additional details about connector terms are provided with FIG. 4.

Another design feature for the user interface may implement a constant menu in the form of quick filters associated with the text input field 120. For example, the quick filters may be turned on to limit or off or expand the options available as interface objects or context terms in the suggestion field 110. The quick filters may provide context terms within interface objects in the suggestion field that are limited to the filters selected by the user or system based at least in part on the user profile or interaction history of the user.

Figure 2:
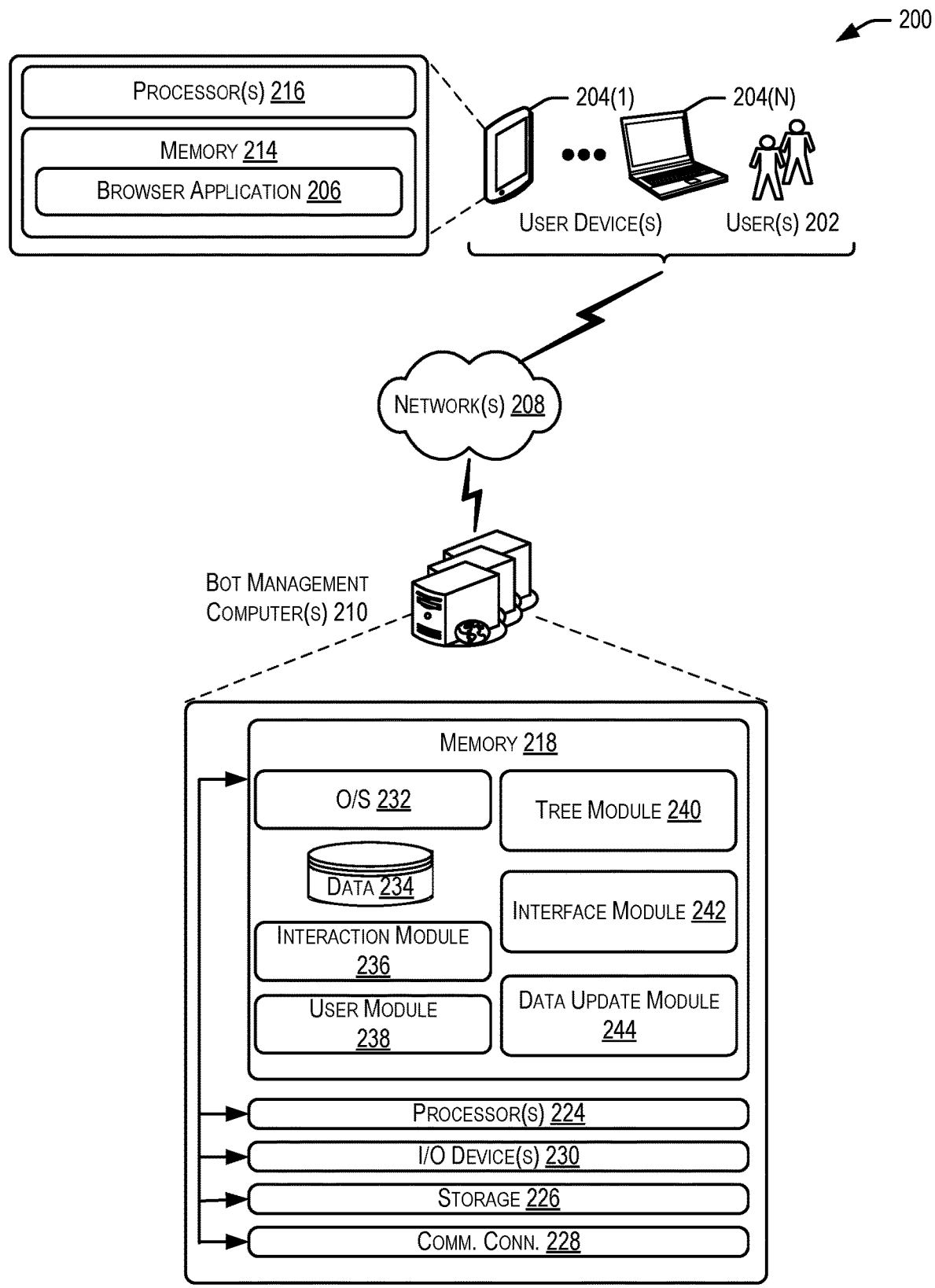
FIG. 2 illustrates an example architecture for providing an interactive bot described herein that includes a bot management computer and/or a user device connected via one or more networks, according to at least one example.

FIG. 2 illustrates an example architecture for providing an interactive bot described herein that includes a bot management computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more bot management computers 210. The one or more bot management computers 210 may, in some examples, provide computing resources such as, but not limited to, client entities, low latency data storage, durable data storage, data access, management, virtualization, cloud-based software solutions, electronic content performance management, etc. The one or more bot management computers 210 may also be operable to provide web hosting, computer application development, and/or implementation platforms, combinations of the foregoing, or the like to the one or more users 202. The one or more bot management computers 210, in some examples, may help provide an interactive bot, including a chat-bot, to one or more user devices 204.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the bot management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more bot management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the bot management computers 210 via the networks 208, or via other network connections. Additionally, the user devices 204 may be part of the distributed system managed by, controlled by, or otherwise part of the bot management computers 210 (e.g., a console device integrated with the bot management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the bot management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the bot management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the bot management computers 210 may be in communication with the user devices 204 and/or other service providers via the networks 208, or via other network connections. The bot management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the bot management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of bot management computers 210, the memory 218 may be volatile (such as RAM) and/or non-volatile (such as ROM, flash memory, etc.). The bot management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the bot management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the bot management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The bot management computers 210 may also contain communications connection(s) 228 that allow the bot management computers 210 to communicate with a stored database, another computing device or server, user terminals and/or other devices on the networks 208. The bot management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an interaction module 236, a user module 238, a tree module 240, an interface module 242, and/or a data update module 244. The modules may be software modules, hardware modules, or a combination thereof. If the modules are software modules, the modules will be embodied on a computer readable medium and processed by a processor in any of computer systems described herein.

The interaction module 236 may be configured to determine one or more interactions between user device and the user interface. The interactions may comprise tapping or selecting a display in a particular area of the user interface or audible interactions using speech recognition algorithms known in the art.

The user module 238 may be configured to determine a user profile or interaction history associated with the user. The interaction history may identify previous interactions with the user interface and identified in conjunction with the interaction module 236.

The tree module 240 may be configured to generate a context suggestion tree to correlate input from a text input field with output in the form of search results or context terms within interface objects in this suggestion field. The tree module 240 may generate a context suggestion tree with multiple levels in a hierarchical format.

The interface module 242 may be configured to provide a suggestion field and a text input field on a user interface. In some examples, the suggestion field may be adjacent to the text input field. In some examples, the suggestion field may comprise one or more context terms within interface objects that may be selected, added, or removed to alter the context of the suggestion.

The interface module 242 may be configured to, in conjunction with the tree module 240, provide ghost text for a context term, connector term, or other interface objects of the user interface. The ghost text may be chosen based at least in part on traversing the context suggestion tree and selecting a term that is likely to be selected by the user based at least in part on the terms that are currently in the text input field or suggestion field of the user interface.

The data update module 244 may be configured to analyze responses from the user associated with selected context terms from the suggestion field that are moved to the text input field an update in natural language understanding (NLU) data store.

Figure 3:
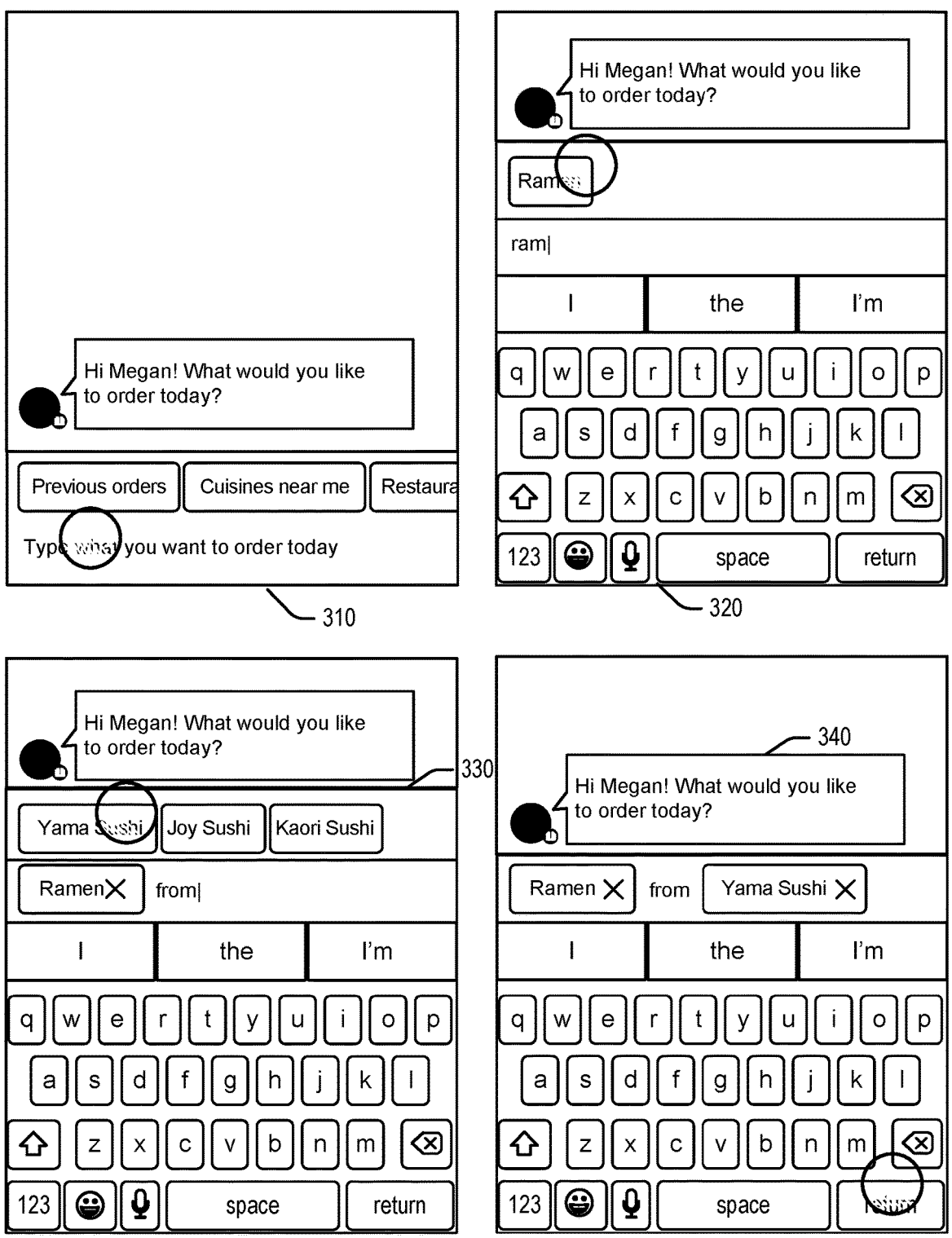
FIG. 3 illustrates an example user interface for providing an interactive bot, in accordance with embodiments of the disclosure.

FIG. 3 illustrates an example user interface for providing an interactive bot, in accordance with embodiments of the disclosure. In illustration 300, a first user interface 310 is provided upon accessing a software application or browsing to a network document that would implement an interactive bot via a user interface. The interactive bot may provide an interface object to elicit an interaction from the user via the user interface. As illustrated, the first user interface 310 includes "hi Megan! What would you like to order today?" The first user interface 310 also provides context terms within interface objects in a suggestion field. These interface objects comprise "previous orders," "cuisines near me," and "restaurants."

In the second user interface 320, the user has performed a second user interaction by typing "R-A-M" as a start to the term "ramen." The system may compare the input from the user with a dictionary of predetermined terms (e.g., maintained in a data store). The identification of each term in the dictionary may correspond with a context suggestion tree as described in FIG. 4. When the user starts typing, the system may update the options in the suggestion field to include words that start with "R-A-M" in the second user interface 320.

Figure 4:
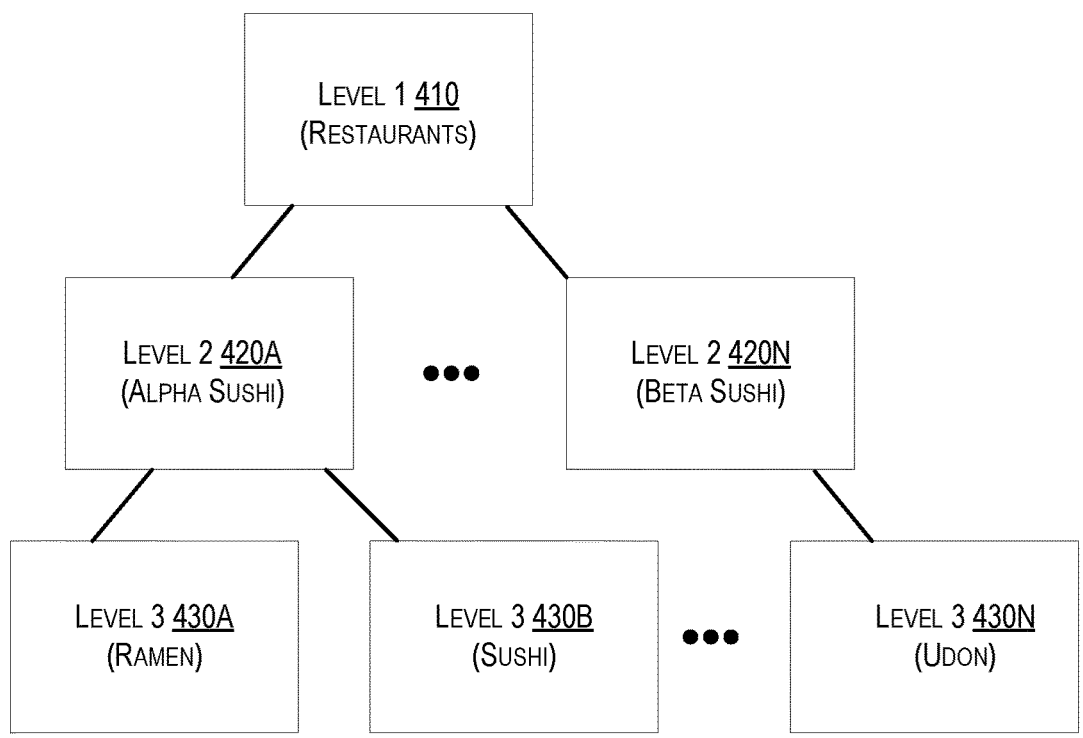
FIG. 4 illustrates an example hierarchy of a context tree structure, in accordance with embodiments of the disclosure.

FIG. 4 illustrates an example hierarchy of a context tree structure, in accordance with embodiments of the disclosure. The context suggestion tree may comprise a hierarchical format tree structure with a series of input and output that is related to each other based at least in part on natural language understanding (NLU). The context suggestion tree may comprise common cases of received input and expected output to generate the structure of the tree. Any misspellings, words that are accidentally omitted, or synonyms to common words may be attributed to the common cases and follow the structure of the tree. In some examples, the context suggestion tree may also implement Dependency Parsing (e.g., focusing on the relationships between words in a sentence) or Constituency Parsing (e.g., focusing on building a Parse Tree using a Probabilistic Context-Free Grammar (PCFG)).

As shown in illustration 400, the context suggestion tree comprises three levels. The first level 410 may identify a category (e.g., restaurants), the second level 420 may identify particular examples of the category (e.g., alpha sushi, beta sushi, etc.), and the third level 430 may identify items from the particular examples of category (e.g., ramen, sushi, udon, etc.). More or fewer levels of the context suggestion tree may be implemented without diverting from the scope of the disclosure.

Various embodiments of the context suggestion tree are available. For example, the first level 410 may identify a category and different branches from the first level may correspond with different connector terms. Connector terms, such as "from" and "on," may alter branches of the tree to provide different suggestions at different points in time or corresponding with the terms that are currently in the text input field. When traversing the tree, the connector terms may alter which branches of the tree that are selected and returned as options for response to a user interaction, rather than the level of the tree that is returned (e.g., first level vs. second level). As a sample illustration, the first level 410 may identify a category (e.g., restaurants), a first connector term (e.g., "on") may correspond with examples of the category that are open during a particular date or time, so options from the second level 420 may identify date or time options (e.g., "1 pm," "now," etc.). A different branch at the second level 420 may correspond with a second connector term (e.g., "near"), so the options would be limited to locations (e.g., "within 5 miles of me" or "near Main Street").

In some examples, the connector term may be selected based at least in part on a location of the first context term in the context suggestion tree. For example, when the context term is at a leaf node of the tree (e.g., the last node that does not have any child nodes), the traversal of the tree may proceed up one level to a parent node and the connector term for proceeding to that level may be selected (e.g., "from"). In another example, the context term may not be a leaf of the tree, but a parent node. While at the parent node, the traversal may proceed up to a grandparent node or down to a child node or leaf node. The connector terms that may be available for suggestion to the user interface when the traversal is at a parent node may comprise connector terms above or below the parent node (e.g., given two suggestions like "from" and "in").

The connector term may modify the method of traversing the context suggestion tree. In a sample illustration, two terms may be provided in the text input field: the structured data (e.g., the context term in an interface object that is added to the input field) and the connector term. The structured data may have a corresponding element in the tree structure, but the connector term does not. The connector term may be used to traverse the tree. Following the illustration, when the context term is "Thai food" and the connector term is "in," then the interactive bot may provide locations (e.g., Seattle, etc.) which may also comprise tree elements. If the connector is "from," the interactive bot may provide restaurants instead (e.g., "Thai Restaurant") which are a different set of tree elements and branches of the tree.

To use the illustrative context suggestion tree 400, the user may provide a first interaction with the user interface. The first interaction may comprise a statement or question, including "I am in the mood for sushi" or "I would love some ramen." For example, the user may initiate the interaction with the chat-bot by typing the question in a text input field of the user interface. The computing device may parse the statement associated with the first interaction to identify a particular level of the context suggestion tree. In illustration 400, the terms "sushi" and "ramen" correspond with the third level 430 of the context suggestion tree. The computing device may traverse the tree a single level to the second level 420 to determine where the items "sushi" and "ramen" should come from. This may be one example of predicting an expected response and context from the user.

In another embodiment, the interactive bot may provide a question via the user interface to elicit a response from the user. The question may be stored with a data store of questions and chosen based on a variety of factors. For example, the computing device may select a first question from the data store based at least in part on a number of times that other uses have provided the question to the interactive bot (e.g., other users ask "can you send me ramen" and the interactive bot in this instance provides the question "would you like some ramen"). The question may be chosen when the number of times that the question has been asked in the past by other users exceeds a predetermined threshold. In another example, the question may be chosen based on a user profile. For example, the computing device may select a second question based at least in part on the user providing a similar question to the interactive bot in the past (e.g., this particular user asks "can you send me ramen" and the interactive bot in this instance provides the question "would you like some ramen" preemptively). The question may be chosen when the number of times that the question has been asked by the particular user (e.g., according to the user profile) exceeds a predetermined threshold.

In another embodiment, the interactive bot may provide a question via the user interface based at least in part on the context suggestion tree. For example, the first level of the context suggestion tree may provide a question comprising "what would you like to eat today?" The context suggestion tree may be tailored to correspond with the user profile, which may create a context suggestion tree for each user or a group of users.

The computing device may also dynamically construct the context suggestion tree. For example, the computing device may generate the context suggestion tree based at least in part on previous interactions with the user interface or other network documents. These previous interactions may identify correlations between interactions (e.g., search for "ramen") and expected results (e.g., browse to a network document of a restaurant that serves ramen or order ramen from a restaurant). The computing device may presume that the user received expected results when the user performs a secondary action, including ordering the ramen, accessing a detailed item page associated with the restaurant that serves the ramen, and the like.

The context suggestion tree may also be used with audible interactions rather than textual interactions. For example, once the context suggestion tree has been generated, the user may audibly instruct a microphone associated with the computing device that maintains the context suggestion tree, "hey, can you send me a suggestion for ramen." The computing device may traverse the context suggestion tree to determine that the instruction is associated with the third level 430. The computing device may traverse the context suggestion tree a single level to the second level 420 and provide the response through the speaker associated with that level, "I suggest going to alpha sushi for ramen."

Returning to FIG. 3, the user may interact with the suggested context term within the interface object associated with "ramen." By interacting with the interface object, the interface object may be moved from the suggestion field into the text input field and identified as an interface object. The identification of the interface object may highlight the context term "ramen" and provide the user with additional functionality associated with the term, including moving the term to a different area in the user interface or removing the term entirely (e.g., selecting the "X" tool).

The user may provide other textual input as well to the text input field as connectors. For example, after selecting the interface object for "ramen," the user may also provide the connector term "from." The text input field may comprise the words "ramen" and "from." The term "from" may be identified by the computing device not as a term associated with a search query, including an item that the user is searching for or a location that provides item, but an indication of additional information that is associated with the context terms currently in the text input field. For example, the term "from" may identify that the next level of the context suggestion tree should correspond with locations that provide item. In another example, the term "at" may identify that the next level of the context suggestion tree should correspond with locations that are open at a particular time to provide item.

The third user interface 330 may comprise suggested terms within interface objects in the suggestion field that consider the order of the terms in the text input field. For example, the suggestion field may be updated with options that correspond with particular places that provide ramen. The user may select one of these options from the suggestion field, for example, "Yama Sushi." The system may generate an interface object with the selected option and add the selected option from the suggestion field into the text input field. The text input field may comprise a first interface object with the term "ramen," a text connector object with the term "from," and a second interface object with the term "Yama Sushi."

The user may interact with interface objects once they are added to the text input field. For example, once the interface object has been moved to the text input field, the position of the interface object may be moved within the text input field or removed entirely without affecting other input in the text input field (e.g., text, other interface objects, etc.). As a sample illustration, the user interface may receive a fourth user interaction with the interactive bot user interface that comprises a second selection of the interface object. The selection of the interface object may correspond with selecting the "x" tool of the interface object. In this example, the interface object may be removed from the text input field without removing other terms from the text input field.

The fourth user interface 340 may comprise a completed search query that includes one or more interface objects and connectors. The search query may be submitted to a query engine in order to receive search results as illustrated with FIG. 5. The search results may be enabled to be displayed at the user interface by the user device.

Figure 5:
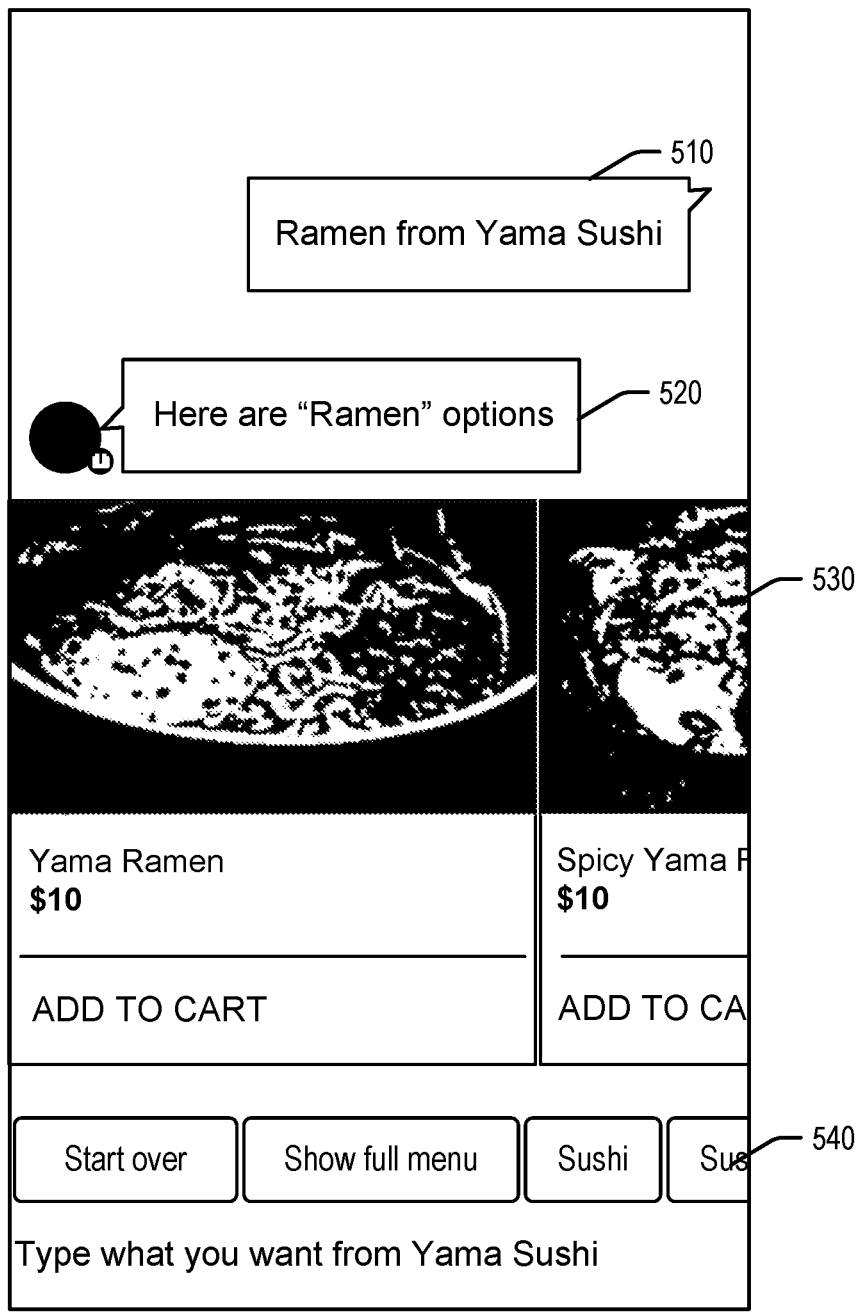
FIG. 5 illustrates an example user interface for providing an interactive bot, in accordance with embodiments of the disclosure.

FIG. 5 illustrates an example user interface for providing an interactive bot, in accordance with embodiments of the disclosure. In illustration 500, the terms included with the text input field may be submitted with a search query 510 via the user interface. The interactive bot may access a data store and compare the input (e.g., the submitted search query) with expected output (e.g., here are your search results). In this example, the interactive bot updates the user interface with a response 520 "here are ramen options" in addition to the search results 530.

The search results 530 may correspond with the terms included in the text input field and submitted with the search query. In some examples, the search results 530 may comprise images, links, or other additional information associated with the search results. For example, the search results may be filtered to correspond only with the terms included with the text input field (e.g., "ramen," "from," and "Yama Sushi").

Additional interface objects 540 may be provided as well. For example, once the search results 530 are provided, the interactive bot may provide a second question to elicit additional interactions from the user. The additional interface objects 540 may again correspond with the context suggestion tree. For example, the first level of the context suggestion tree may correspond with a search query, the second level of the context suggestion tree may correspond with search results, and the third level of the context suggestion tree may correspond with actions performed after receiving search results. Since the user interface provided items at the second level of the context suggestion tree the user interface may now provide items from the third level of the context suggestion tree when traversing the tree. As illustrated, the suggestions at this level of the context suggestion tree may include "start over," "show full menu," and "sushi."

Figure 6:
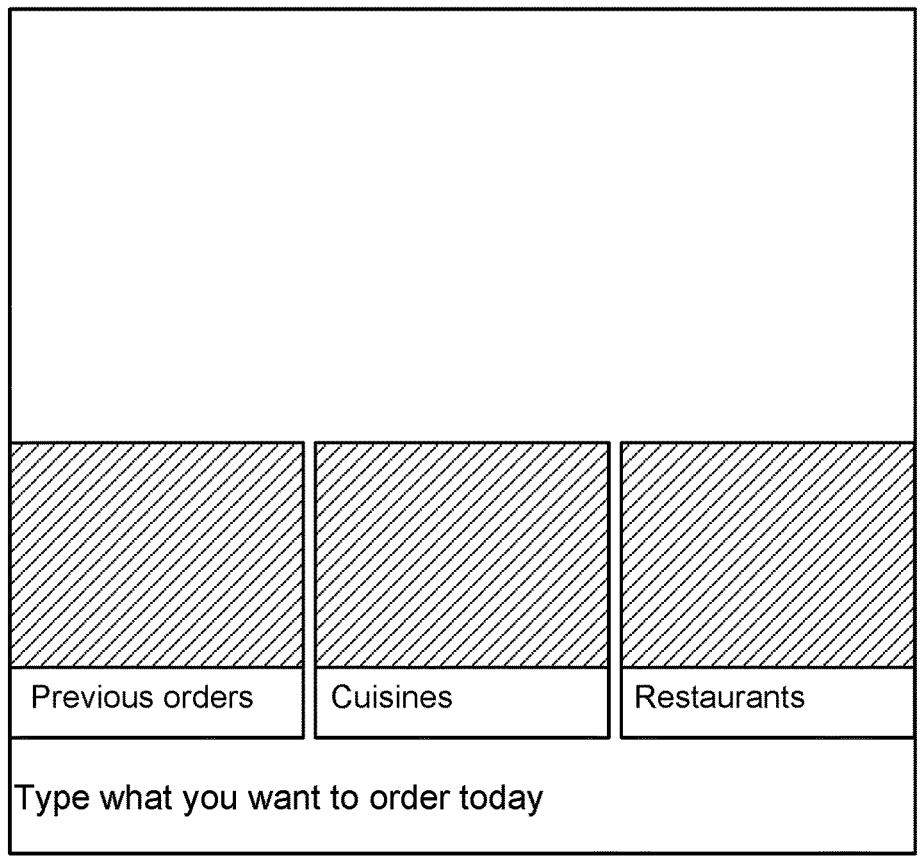
FIG. 6 illustrates an example user interface for providing an interactive bot, in accordance with embodiments of the disclosure.

FIG. 6 illustrates an example user interface for providing an interactive bot, in accordance with embodiments of the disclosure. In illustration 600, other formats of user interfaces may be provided as well. For example, the user interface may provide images of where to start a search, including "previous orders," "cuisines," and "restaurants." The user interface may also provide ghost text, including "type what you want to order today" as an alternative method for interacting with interactive bot.

Figure 7:
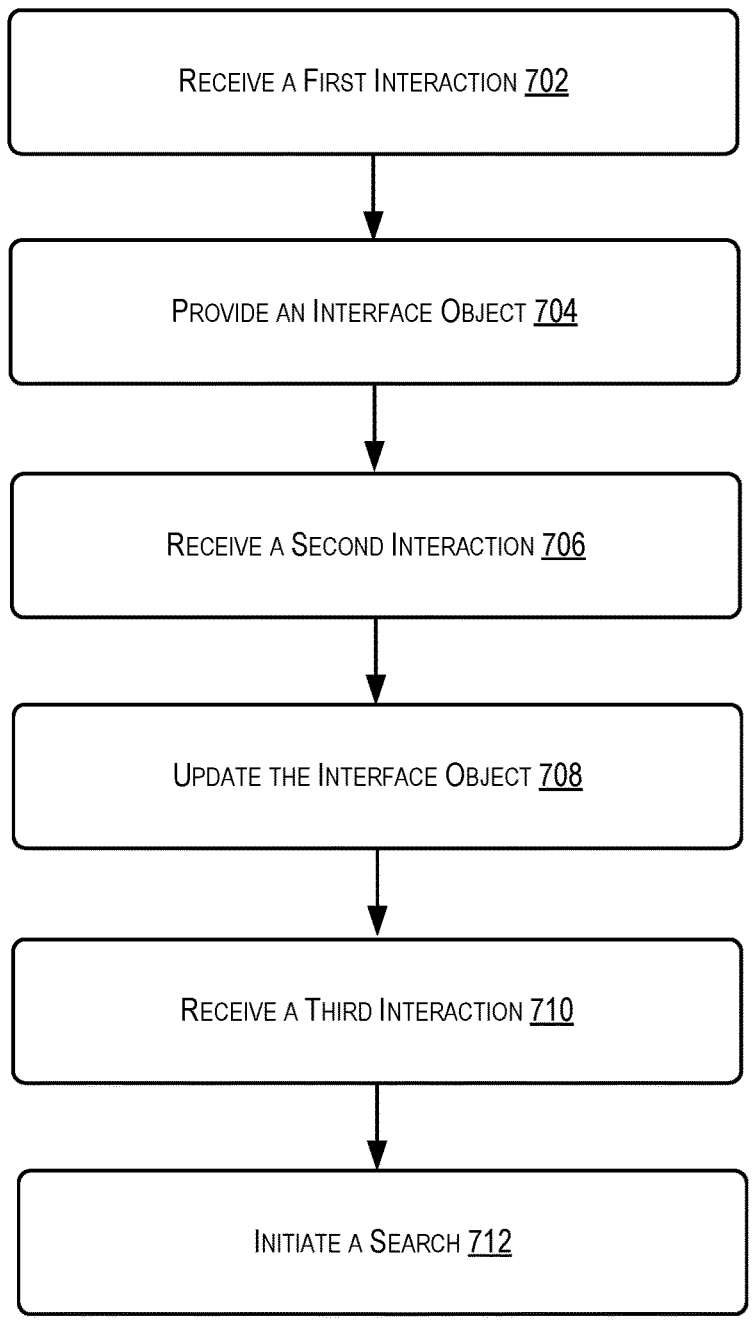
FIG. 7 illustrates an example flow diagram for providing an interactive bot described herein, according to at least one example.

FIG. 7 illustrates an example flow diagram for providing an interactive bot described herein, according to at least one example. In some examples, the one or more bot management computers 210 (e.g., utilizing at least one of the interaction module 236, the user module 238, the tree module 240, the interface module 242, and/or the data update module 244) or one or more user devices 204 shown in FIG. 2 may perform the process 700 of FIG. 7.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 700 may begin at 702 by receiving a first interaction. For example, the bot management computers 210 may receive the first interaction via the user interface from a computing device of the user. The bot management computers 210 may identify the first interaction as corresponding with a suggestion field or a text input field provided by the user interface. In some examples, the user interface may comprise a suggestion field any text input field. For example, the suggestion field may be located adjacent to the text input field on the user interface or in a different location.

At 704, an interface object may be provided. For example, the bot management computers 210 may provide a first context item within an interface object of the user interface. The interface object may be presented in a suggestion field of the user interface. The interface object may be operable to be added and removed from the text input field of the user interface irrespective of other interface objects of the user interface.

At 706, a second interaction may be received. For example, the bot management computers 210 may receive a second interaction with the interactive bot at the user interface. The second user interaction may comprise a selection of the interface object and be provided from the computing device of the user.

At 708, the interface object may be updated. For example, the bot management computers 210 may update the interface object from being presented in the suggestion field to being presented in the text input field of the user interface. The updated location of the interface object may correspond with the second user interaction.

At 710, a third interaction may be received. For example, the bot management computers 210 may receive the third user interaction with the interactive bot at the user interface. The third user interaction may request search results associated with the context of the text input field including user interface object.

At 712, a search may be initiated. For example, the bot management computers 210 may initiate a search based at least in part on the contents of the text input field. In some examples, the bot management computers 210 may provide the results of the search within the user interface based at least in part on the third user interaction and on the interface object remaining in the text input field of the user interface.

Figure 8:
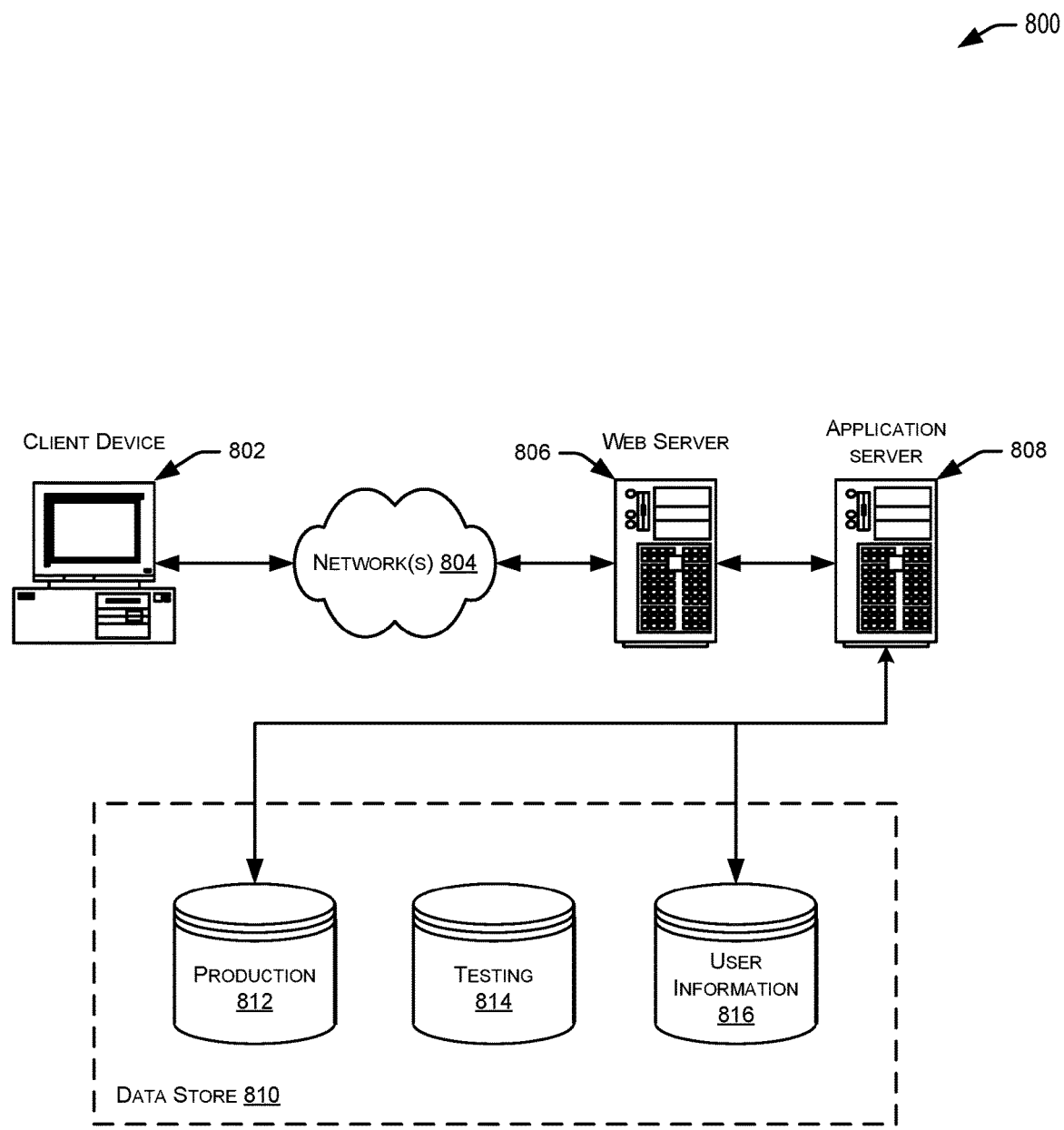
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing system, comprising:
one or more processors; and
one or more computer-readable storage media comprising instructions that, upon execution with the one or more processors, cause the computing system to at least run an interactive bot hosted on the computing system, wherein the interactive bot is configured to at least:
receive a first user interaction with the interactive bot at a user interface, the first user interaction provided from a computing device of a user, and the user interface comprising a suggestion field and a text input field, the suggestion field being located adjacent to the text input field on the user interface, the text input field configured to receive text as input to the interactive bot for a search;
provide, to the computing device for presentation at the user interface, an interface object presented in the suggestion field of the user interface and including a first context term within the interface object, and the interface object being operable to being added and removed from the text input field of the user interface irrespective of other interface objects of the user interface;

receive a second user interaction with the interactive bot at the user interface, the second user interaction comprising a selection of the interface object and provided from the computing device of the user;

update the interface object from being presented in the suggestion field to being presented in the text input field of the user interface based at least in part on the second user interaction, the interface object being individually controllable in the text input field based at least in part on a user interaction with the interface object and without affecting another element presented in the text input field;

receive a third user interaction with the interactive bot at the user interface, the third user interaction requesting search results associated with contents of the text input field including the interface object;

initiate the search based at least in part on the contents in the text input field; and provide, to the computing device for presentation in a presentation field of the user interface other than the suggestion field and the text input field, the search results based at least in part on the search, the search results presented within the presentation field based at least in part on the third user interaction and on the interface object remaining in the text input field of the user interface.

2. The computing system of claim 1, the interactive bot being further configured to:

receive a fourth user interaction with the interactive bot at the user interface, the fourth user interaction comprising a second selection of the interface object in the text input field; and remove the interface object from the text input field without removing other terms from the text input field.

3. The computing system of claim 2, the interactive bot being further configured to:

determine a second context term within a second interface object; and provide, to the computing device for presentation at the user interface, the second context term presented in the suggestion field.

4. The computing system of claim 2, wherein the interface object is removed by activating a tool associated with the interface object.

5. A computer-implemented method, comprising:

transmitting, by a computing system hosting an interactive bot to a computing device, instructions to present a user interface, the user interface comprising a suggestion field and a text input field, the suggestion field configured to present an output of the interactive bot, the text input field configured to receive an input to the interactive bot;

receiving, by the computing system, the input at the text input field; and transmitting, by the computing system to the computing device and based at least in part on the input, an interface object that comprises a first context term, the interface object presented in the suggestion field as the output and configured to be moved to the text input field, the interactive bot configured to generate one or more context terms for presentation in another interface object, the one or more context terms generated based at least in part on the previously transmitted interface object being moved to the text input field, the previously transmitted interface object further configured to be individually controllable in the text input field based at least in part on a user interaction with the previously transmitted interface object being in the text input field and without affecting another element presented in the text input field.

6. The computer-implemented method of claim 5, further comprising:

receiving, by the computing system, a selection of the interface object presented in the suggestion field;

updating, by the computing system, the interface object from being presented in the suggestion field to being presented in the text input field of the user interface based at least in part on the selection;

receiving, by the computing system, a request for a search result associated with contents in the text input field; and providing, by the computing system to the computing device for presentation at a presentation field of the user interface other than the suggestion field and the text input field.

7. The computer-implemented method of claim 6, further comprising:

generating, by the computing system, a context suggestion tree, the context suggestion tree having a hierarchical format tree structure; and selecting, by the computing system, a second context term based at least in part on the context suggestion tree and on the interface object being moved to the text input field, wherein the context suggestion tree comprises multiple levels related to each other to suggest terms via the user interface.

8. The computer-implemented method of claim 7, wherein the context suggestion tree identifies connected terms through machine learning and iterative processing.

9. The computer-implemented method of claim 5, further comprising:

accessing a user profile of a user, the user profile identifying historical interactions between the user and the user interface; and determining the first context term of a plurality of context terms based at least in part on the user profile.

10. The computer-implemented method of claim 5, wherein the interactive bot comprises a computer program that provides audio or text to initiate an action.

11. The computer-implemented method of claim 5, wherein the suggestion field is located adjacent to the text input field on the user interface.

12. The computer-implemented method of claim 5, further comprising:

accessing a user profile; and providing a question via the user interface to elicit a selection of the interface object in the suggestion field based at least in part on the user profile.

13. One or more computer-readable storage media collectively storing computer-executable instructions that, when executed by one or more computer systems hosting an interactive bot, configure the one or more computer systems to collectively perform operations comprising:

transmitting, to a computing device, instructions to present a user interface on the computing device, the user interface comprising a suggestion field and a text input field, the suggestion field configured to present an output of the interactive bot, the text input field configured to receive an input to the interactive bot;

receiving the input at the text input field; and transmitting, the computing device and based at least in part on the input, an interface object that comprises a first context term, the interface object presented in the suggestion field as the output and configured to be moved to the text input field, the interactive bot configured to generate one or more context terms for presentation in another interface object, the one or more context terms generated based at least in part on the previously transmitted interface object being moved to the text input field, the previously transmitted interface object further configured to be individually controllable in the text input field based at least in part on a user interaction with the previously transmitted interface object being in the text input field and without affecting another element presented in the text input field.

14. The one or more computer-readable storage media of claim 13, wherein the suggestion field comprises terms from a dictionary that correspond with contents in the text input field.

15. The one or more computer-readable storage media of claim 13, wherein the text input field comprises at least one connector term.

16. The one or more computer-readable storage media of claim 15, wherein the connector term modifies a method of traversing a context suggestion tree, the context suggestion tree having a hierarchical format tree structure, wherein a level of the hierarchical format tree structure associates the input with the first context term.

17. The one or more computer-readable storage media of claim 16, wherein the connector term is selected based at least in part on a location of the first context term in the context suggestion tree, and wherein the connector term is provided as ghost text in the text input field of the user interface.

18. The one or more computer-readable storage media of claim 13, wherein contents of the text input field are submitted as a search query.

19. The one or more computer-readable storage media of claim 18, further comprising:
receiving search results within the user interface in response to the submitted search query; and
enabling to display the search results by the user interface.

20. The one or more computer-readable storage media of claim 13, wherein the operations further comprise:
receiving a selection of the interface object at the user interface;
updating the interface object from being presented in the suggestion field to being presented in the text input field of the user interface based at least in part on the selection;
receiving text input at the text input field;
updating the suggestion field to present one or more additional interface objects;
receiving a request for a search result associated with contents in the text input field, the contents comprising the first context term and the text input; and
providing, to the computing device for presentation at the user interface, the search result based at least in part on the request, wherein the interface object is operable to being added and removed from the text input field of the user interface irrespective of other interface objects of the user interface.

21. The computing system of claim 1, wherein the text input field is configured to present the other element, wherein the other element comprises at least one of an input text or a different interface object, and wherein the interface object is presented next to the other element in the text input field.

* * * * *